United States Patent [19]

Maier-Laxhuber et al.

[11] Patent Number: 5,518,069
[45] Date of Patent: May 21, 1996

[54] SORPTION APPARATUS AND METHOD FOR COOLING AND HEATING

[75] Inventors: Peter Maier-Laxhuber; Jörn Schwarz, both of München, Germany

[73] Assignee: Zeo-Tech, Unterschleissheim, Germany

[21] Appl. No.: 260,016

[22] Filed: Jun. 15, 1994

Related U.S. Application Data

[63] Continuation of Ser. No. 931,038, Aug. 14, 1992, abandoned.

[30] Foreign Application Priority Data

Aug. 14, 1991 [DE] Germany ............ 41 26 960.8

[51] Int. Cl.⁶ ................................. F28D 15/00
[52] U.S. Cl. ............... 165/104.12; 62/481; 62/480
[58] Field of Search ............... 165/104.12, 10; 62/480, 478, 477, 481

[56] References Cited

U.S. PATENT DOCUMENTS

| | | | |
|---|---|---|---|
| 1,711,804 | 5/1929 | Munters | 62/477 |
| 1,833,901 | 12/1931 | Hull | 62/477 |
| 2,276,947 | 3/1942 | Kleen | 62/481 |
| 4,161,211 | 7/1979 | Duffy et al. | 165/104.12 X |
| 4,205,531 | 6/1980 | Brunberg et al. | 62/480 X |
| 4,752,310 | 6/1988 | Maier-Laxhuber et al. | 165/104.12 X |
| 4,829,772 | 5/1989 | Bogdanovi et al. | 165/104.12 X |
| 4,922,998 | 5/1990 | Carr | 165/10 |
| 4,924,676 | 5/1990 | Maier-Laxhuber et al. | 62/480 X |

FOREIGN PATENT DOCUMENTS 0202090  9/1986  Japan ............... 165/104.12

Primary Examiner—John Rivell
Assistant Examiner—Christopher Atkinson
Attorney, Agent, or Firm—Hoffmann & Baron

[57] ABSTRACT

Apparatus and method for storing and providing heat or cold whereby during a desorption phase, steam-like operating medium is desorbed as a result of a temperature increase of sorption medium. The steam-like operating medium condenses in an operating medium container. After the desorption phase, an additional amount of heat is provided and the liquid operating medium as well as the sorption medium are maintained at a relatively high temperature. Afterward, the heat is withdrawn and the sorption medium is permitted to receive steam-like operating medium and release sorption heat. When cold is to be generated, the liquid operating medium and the sorption medium are permitted to cool off to an ambient temperature and not further heated.

16 Claims, 1 Drawing Sheet

SORPTION APPARATUS AND METHOD FOR COOLING AND HEATING

This is a continuation of application Ser. No. 07/931,038 filed on Aug. 14, 1992 abandoned.

FIELD OF THE INVENTION

This invention relates to sorption apparatus for heating and cooling, and more particularly to an energy conversion apparatus wherein energy is converted by the sorption of operating medium by a sorption agent.

DESCRIPTION OF THE PRIOR ART

Devices which operate in accordance with sorption methods and which make use of the absorption and release of heat are commonly referred to as sorption apparatus. Sorption apparatus are preferable as compared to traditional compression cooling machines in that sorption apparatus can be thermally driven (i.e., that at least the sorption medium is maintained at a relatively high temperature level at the conclusion of the desorption phase thereby providing for a considerable amount of stored heat energy). In these devices, heat energy is stored in the sorption medium for later use in conjunction with the sorption heat which is released during the sorption process. Alternately, cold can be produced during the sorption phase when vaporized operating medium is absorbed from the operating medium container.

German Patent No. 3413 349.6 discloses a device for using stored heat. In this reference, off peak electricity is provided to the apparatus during a desorption phase of operation at night. During the day, heat energy is withdrawn from the apparatus and used to heat a desired area.

It is foreseen that in the future, legislation regarding exhaust gases from automobiles will become so prevalent and severe that only a small percentage of newly registered motor vehicles will be permitted to generate and emit exhaust gases. Therefore, in many cities, electric cars will be the preferred mode of transportation. Similar to traditional gasoline powered vehicles, the interior of the electric cars will have to be heated in the winter and cooled in the summer. Heating of vehicle compartments in this manner uses a considerable amount of electric power. Therefore, it is not currently practical to heat an electro-vehicle with energy from the vehicle's battery due to the need for electric power to be used for transportation. An alternative to an electrical heating device is a heating device which utilizes fossil fuels. However, if it is desired to heat without exhaust gases, this is not a solution.

The cooling of the passenger compartment of an electro-vehicle is no less problematic if a battery operated compressor is to be used. The expense and size of electromotors, compressors, evaporators, liquefiers and, in particular, the addition of batteries for use only in the heating and cooling system are far more costly and take up far more additional space as compared to that required for a conventional vehicular air conditioning system. It should also be mentioned that it is not possible to heat the interior of a vehicle with the use of a conventional air conditioning system. Therefore, separate heating and cooling systems are required which result in additional weight to the vehicle.

OBJECTS AND SUMMARY OF THE INVENTION

It is an object of the present invention to provide a combined storage unit and method for both heating and cooling of an enclosed space.

It is another object of the present invention to provide a heating and cooling apparatus which consists of environmentally safe materials.

It is a further object of the present invention to provide sorption apparatus and method for cooling and/or heating which overcomes the inherent disadvantages of known sorption heating and cooling devices.

In accordance with one form of the present invention, sorption apparatus for heating and cooling includes sorption medium enclosed within a sorption medium container which is encased by an insulating container. As used hereinafter, the term sorption includes adsorption as well as absorption. An electric heater is also included to provide a supply of heat during a desorption phase. An air blower may be included in order to provide an air flow in the space between the insulating container and the sorption medium containers so that heat can be discharged from the sorption medium.

The sorption apparatus further includes an operating medium container coupled to the sorption medium container by an operating medium steam line. The operating medium steam line includes a shut off device which in its closed position prevents operating medium, which is stored in the operating medium container, from flowing into the sorption medium container. The operating medium container is thermally insulated by a thermal insulating hood. An air blower can be included to provide an air flow in the space between the thermal insulating hood and the operating medium container. A control and regulating unit can also be included for comparing the temperature of the operating medium with the temperature of the sorption medium and for altering the position of the shut off device and the intensity of the electric heater.

These and other objects, features, and advantages of this invention will be apparent from the following detailed description of illustrative embodiments thereof, which is to be read in connection with the accompanying drawings.

DETAILED DESCRIPTION OF THE PREFERRED EMBODIMENTS

Figure 1:
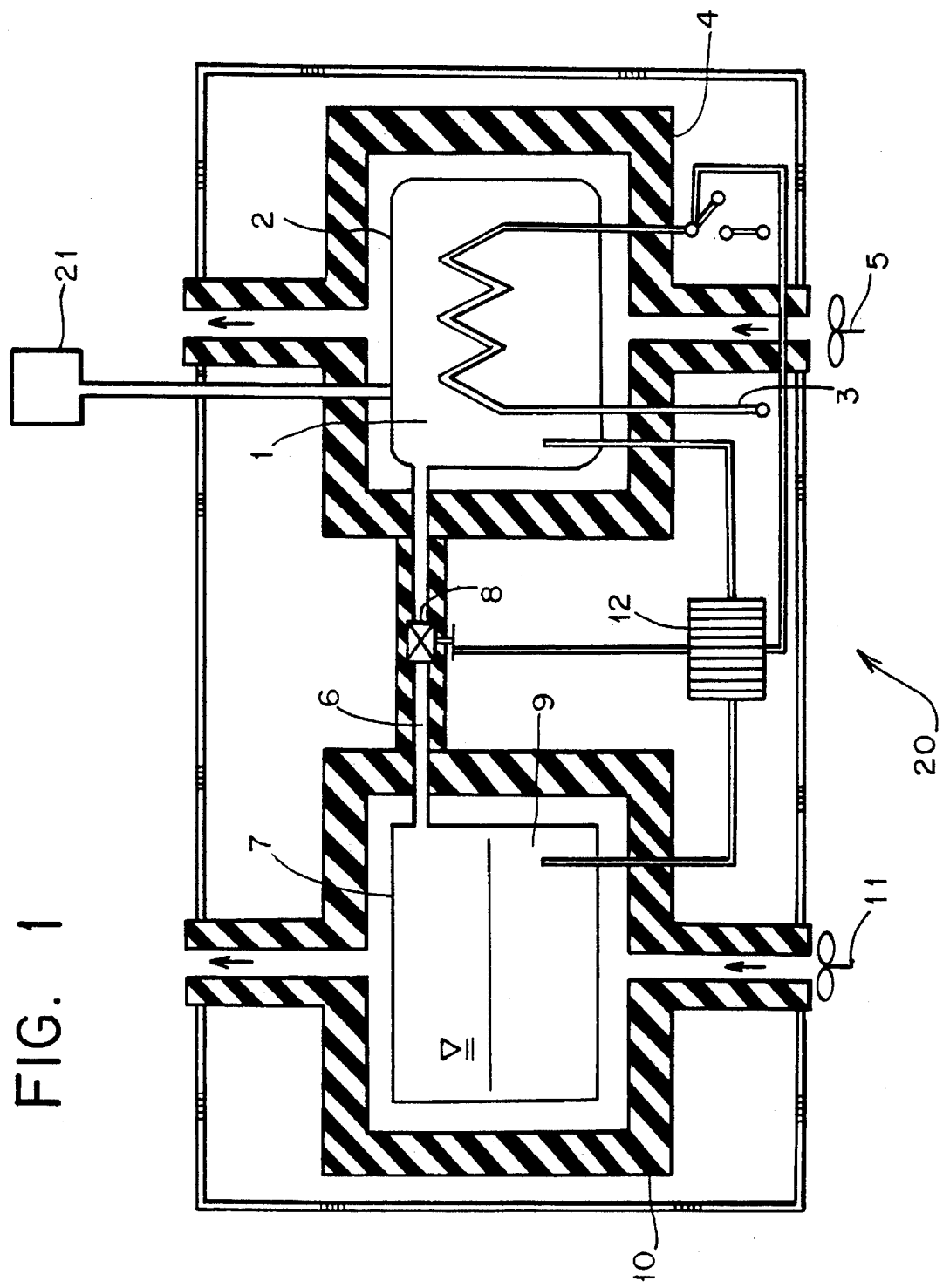
FIG. 1 is a cross-sectional view of the sorption apparatus for cooling and heating of the present invention.

Referring now to FIG. 1 of the drawings, sorption apparatus for cooling and heating constructed in accordance with the present invention will now be described. As used hereinafter, the term sorption is meant to include both adsorption and absorption of an operating medium. The sorption apparatus 20 shown in FIG. 1 is preferably used in conjunction with an electric car and includes sorption medium 1 contained within a sorption medium container 2 which is enclosed within an insulating container 4. An electric heater 3 is preferably included and extends from the exterior of the sorption medium container into the interior of the sorption medium container and is surrounded by sorption medium. The electric heater supplies heat during a desorption phase of operation. An air blower 5 may be included in order to provide an air flow in the space between the insulating container and the sorption medium container so that heat can be discharged from the sorption medium.

The sorption apparatus 20 further includes an operating medium container 7 coupled to the sorption medium container 2 by an operating medium steam line 6. The operating medium steam line includes a shut-off device 8 which in its closed position prevents the operating medium, which is stored within the operating medium container, from flowing into the sorption medium container. The operating medium container is heat insulated by a thermal insulating hood 10. An air blower 11 is preferably included to provide an air flow in the space between the thermal insulating hood and the operating medium container. A control and regulating unit 12 can also be included for comparing the temperature of the operating medium with the temperature of the sorption medium. Based upon the detected temperatures, the control and regulating unit alters the position of the shut off device. In addition the control and regulating unit varies the amount of heat generated by the electric heater. Therefore, the control and regulating unit manipulates the amount of operating medium that is absorbed and desorbed by the sorption medium.

The sorption apparatus of the present invention operates in two partial phases. In a first partial phase called the desorption phase, heat is applied to the sorption medium which causes the operating medium to be expelled from the sorption medium. The addition of heat causes the operating medium to convert to a steam-like operating medium. The steam-like operating medium can be subsequently liquified by removing the applied heat energy from the operating medium. The liquified operating medium can thereafter be stored for later use during the second partial phase called the sorption phase.

In the second partial phase, the operating medium absorbs heat and again transforms into a vapor operating medium. Thereafter if the shut off device is open, the sorption medium absorbs the operating medium and binds it. As a result, the sorption medium removes heat energy from the operating medium and the sorption medium is heated. As a result of the transfer of heat energy from the operating medium to the sorption medium, the operating medium will again take on a liquid form. The temperature of the operating medium which is not vaporized and which remains in liquid form in the operating medium container will decrease because the evaporation of operating medium absorbs heat from the liquid operating medium. The sorption phase can continue until the sorption medium is saturated. The state of saturation essentially depends upon the temperature of the sorption medium and the evaporation temperature of the operating medium.

The control and regulating unit 12 manipulates the electric heater 3 in order to heat the sorption medium 1 until it reaches its desorption temperature. When the desorption temperature is attained, the operating medium is driven from the sorption medium. As a result, the operating medium is forced through both the operating medium steam line 6 and the opened shut off device 8 into the operating medium container 7. The vaporized operating medium will preferably condensate along the walls of the operating medium container 7. Therefore, when a substance such as water is utilized as the operating medium, the condensation within the operating medium container will occur at a relatively high temperature (up to 100° C.) and a great deal of heat energy will be maintained.

Air blower 11 is utilized to cool the operating medium if the condensation pressure within the operating medium container 7 rises above atmospheric pressure. After completion of the desorption phase, internal heat that may have been lost due to the insulating containers can be replaced by electric heater 3.

The thermal energy required for the operation of the sorption apparatus of the present invention is preferably provided to the sorption medium 1 in conjunction with the charging or re-charging of the power supply/battery of an electro-car within which the sorption apparatus is preferably contained.

In order to provide the generated heat to the passenger compartment of the vehicle to which the sorption apparatus is attached, air blower 5 forces recirculated air from the passenger compartment over the sorption medium container 2 and provides it to the passenger compartment. The sorption medium 1 serves to heat the air provided by air blower 5 by transferring heat energy from the sorption medium, through the sorption medium container, to the air. As a result, the temperature of the sorption medium decreases. Therefore, the sorption medium will absorb additional steam-like operating medium 9 which transports additional heat energy. The rate of flow of the operating medium may be controlled by the shut off device 8. During absorption of the steamlike operating medium, the heat energy released during condensation of the operating medium in addition to the heat energy released during sorption will be used to heat the air flow provided by the air blower. As a result, the operating medium still remaining in the operating medium container will be further cooled.

As soon as the temperature of the operating medium 9 falls below the temperature of the exhaust air, ambient air can be directed over the surfaces of the operating medium container 7 by air blower 11. If a sufficient ambient heat source is not available, the operating medium may solidify in the operating medium container 7, therefore providing latent heat.

The operation of the present invention with regard to providing cold is similar to that of generating and providing heat. In this regard, the air fed by air blower 11 is merely directed into the inner compartment which is being cooled while the air which is provided by air blower 5 is discharged into the environment.

In accordance with the sorption apparatus of the present invention, one device can alternately generate and supply both heat and cold. In order to obtain an optimum supply of heat or cold, only a slight variation of the basic method must be made after the initial desorption phase is complete. As previously stated, both the heating and cooling methods contain a desorption phase wherein the sorption medium is heated by a supply of heat. As a result, operating medium which had previously been absorbed, (i.e., operating medium steam) is driven out of the sorption medium. Advantageously, this operating medium steam is recondensed and stored in the operating medium container. As a result, new operating medium need not be supplied into the apparatus after each desorption phase.

As stated above, the method steps of the heating and cooling process differ from each other after the desorption phase is complete. When only heat is to be provided, the sorption medium is preferably maintained at the maximum temperature in order to provide the maximum amount of heat for later use. This is preferably achieved by storing the sorption medium in a thermally insulated device and if need be, compensating any heat loss by additional heating. Thereafter, the vaporized operating medium is preferably reliquefied at its maximum condensation temperature. If water is used as the operating medium, the condensation temperature can be as high as 100° C. Up to this temperature, the sorption apparatus system is still in the vacuum range. Therefore, very bulky and heavy high pressure devices are not required. It is preferable that thermal insulation of the liquid sorption medium be provided during long periods of heat storage.

Again, if need be, any heat loss can be compensated for by supplying additional heat with an electric heater. The shut off device which is located between the sorption medium container and the operating medium container may stay open, since the sorption medium will not cool.

When heat is provided to a passenger compartment by the sorption apparatus as in the preferred embodiment, the temperature of the sorption medium is initially reduced. In conjunction with this decrease in temperature, operating medium steam is absorbed in the sorption medium. In order to generate the steam-like operating medium, liquid operating medium must evaporate within the operating medium container. Evaporation heat is provided from the feasible heat of the liquid operating medium which is stored at a high temperature within the operating medium container. Due to an additional heat reduction caused by the sorption medium, the evaporation temperature of the operating medium will be reduced to a temperature below an ambient temperature. Various types of waste heat from households, factories or vehicles are suitable for use as an ambient temperature level in the sorption apparatus of the present invention. At this point, heat from the sorption apparatus may be used for the further evaporation of the operating medium. Only a liquid or gas like operating medium should be used in conjunction with the evaporation devices and coupled by means of a heat exchanger.

If the ambient temperature level falls below the solidification temperature of the operating medium, the solidification temperature of the operating medium can be manipulated by adding additional substances so that it will be below the ambient temperature level.

A large heat capacity of the total system can be achieved by using greater amounts of operating medium. When a correctly selected amount of operating medium is chosen, the evaporation temperature will always be above a defined temperature level.

When using a suitable operating medium, (for example, water) the heat of solidification of the operating medium itself may serve as the heat source for the evaporation or sublimation of the steam-like operating medium. The heat energy required for providing a usable level of heat is provided in the following order. First, the heat of the sorption medium is accessed, secondly, the heat of the stored operating medium is utilized, thirdly, the pure absorption heat which is generated during the reaction of the operating medium with the sorption medium is used, fourth, additional heat can be brought in from the sorption apparatus by a heater and fifth, the solidifying heat of the operating medium itself is utilized.

When only cooling is required of the sorption apparatus, the amount of stored heat is of no interest. Therefore, it is recommended that after the desorption phase, a further storage of heat within the sorption apparatus not be performed. As time passes, the sorption medium as well as the liquid operating medium will cool off to the ambient temperature level despite the thermal insulation. If this occurs, it is preferable to use the control and regulating unit to completely close the shut off device and keep it turned off so that operating medium will not flow between the containers. Otherwise, the sorption medium whose temperature is falling would draw operating medium steam. This would ultimately heat the sorption medium.

In order to generate cold, the shut off device is preferably opened by the control and regulating unit so that steam-like operating medium can flow into the sorption medium container and combine with the sorption medium. The previously cooled sorption medium is thereby heated and the temperature of the still liquefied operating medium is reduced. The cold which is generated by the evaporation of the operating medium from the operating medium container may be transmitted to any given heat carrier medium by heat exchanger devices. In the preferred embodiment, direct evaporators are utilized which cool ambient air by dehumidifying the same. In the alternative, heat carrier circulators which transfer the generated cold by water circulation or air circulation to a distantly situated cooling area can be used.

In order to utilize the entire heating and cooling capacity of the sorption medium, it is recommended to cool the sorption medium during the sorption phase. In the preferred embodiment, ambient air is taken in by air blowers for this purpose and pushed through suitable heat exchangers. However, liquid heat carriers which have improved heat transfer capability and which can easily transport heat over long distances are also suitable.

The control and regulating unit of the present invention can be designed so that the evaporation temperature of the operating medium is set by opening or closing the shut off device.

Normally, the sorption medium container and the operating medium container of the sorption apparatus are constructed and coupled in an air-tight manner in order to create a vacuum-type environment inside the sorption apparatus. However, it may be advantageous to use non-vacuum systems, wherein the operating and sorption medium containers of the sorption apparatus can be evacuated by means of an additional air pump. The airpump may be a vacuum pump which is coupled to the sorption medium container. The vacuum pump 21 preferably decreases the internal pressure within the sorption medium container. As a result, the steamlike operating medium can freely flow to and within the sorption medium filler. It is only necessary to remove all air from the sorption medium to such an extent that the given steam-like operating medium pressure falls below the operating medium pressure when the system is not air tight. Since non-airtight systems do not have strict requirements with respect to the vacuum tightness, it is also possible to easily separate the sorption medium from the sorption apparatus in order to desorb the sorption medium at a remote location. This could result in quicker and more energy efficient desorption of the sorption medium. This is particularly advantageous if the charged sorption medium filler is so heavy that the sorption apparatus could not be carried by one person.

It has also been shown to be advantageous to desorb the sorption medium by using a separate electric heating device. Therefore, desorption of the sorption medium can occur at different voltages and temperature by simple manipulation of electrical heat resistors.

In a preferred embodiment, the sorption apparatus of the present invention may be advantageously integrated into a motor vehicle. This could be a vehicle powered by an internal combustion engine as well as battery operated vehicle. The size of the sorption apparatus has to be selected in such a way so that during a predetermined maximum operating time, the generatable heat or the generatable cold is sufficient to properly alter the temperature of the passenger compartment of the vehicle to which the device is affixed.

When the sorption apparatus is to be used in conjunction with an internal combustion vehicle, it may be advantageous to attach the sorption apparatus only when heating and cooling of the passenger compartment is needed.

If the sorption apparatus has an additional pump as previously mentioned, the pump can be operated using the 12 or 24 V battery of the vehicle. A blower which directs the heated or cooled air within the vehicle may also be powered by the vehicle's battery.

The heat of sorption which is to be discharged from the sorption medium can be expelled by using a small circulating pump and a heat exchanger which can be extended through an opened side window.

Desorption utilizing a household power supply is advantageous for battery operated vehicles. For example, desorption of the sorption medium may take place while the vehicle's battery is being charged. Since the vehicle remains connected to the power supply until the next trip, any required compensation of the thermal heat losses can be maintained by additional heating even after the desorption phase has been completed. Since the desorption process did not access power from the car battery, the vehicle's battery will be fully charged at the beginning of a journey.

When a drive is started and the apparatus is utilized wherein a long period of time must be bridged between trips without coupling to an electrical heater, it is advantageous to keep the shut off device closed as long as possible and initially only emit the heat from the sorption medium. If the heat from the sorption medium is no longer sufficient to heat the inner compartment of the vehicle, the shut off device may be gradually opened in order to release the heat stored in the operating medium. Since a return trip usually encompasses the same amount of time as the first leg of a journey, the sorption container will be cooled to almost ambient temperature by the end of the return trip. Therefore, heat will not be lost from the sorption medium even if there is a relatively long waiting time between trips. During the waiting time, the liquid operating medium will also cool off. By opening the shut off device, a considerable amount of heat will be released in the sorption medium for the return trip. However, this amount of heat is about as large as the noticeable amount of heat previously stored in the hot sorption medium.

It is particularly advantageous to use zeolite as the sorption medium and water as the operating medium. Zeolite exhibits a very high affinity for water with a relatively high sorption heat. Moreover, water has a very high specific heat of evaporation and a high solidification enthalpy. Together, the water and zeolite are particularly suitable for mobile storage and cold generators.

Zeolites may be heated to very high temperatures without exhibiting decomposition phenomenons. This enables very high storage temperatures with a great component of noticeable heat. Also, water can be stored at 100° C. without designing the systems for excess pressure. Furthermore, zeolites are not harmful to the environment and can be reused without complications.

Although illustrative embodiments of the present invention have been described herein with reference to the accompanying drawings, it is to be understood that the invention is not limited to those precise embodiments and that various other changes and modifications may be effected therein by one skilled in the art without departing from the scope or spirit of the invention.

What is claimed is:

1. Sorption apparatus having a storage and discharge capability of heat and cold comprising:

(a) a sorption medium container having sorption medium therein, the sorption medium container further including a heating element for providing heat energy to the sorption medium container;

(b) an operating medium container having operating medium therein, the operating medium container being coupled to the sorption medium container by an operating medium steam line which permits a flow of evaporated operating medium therethrough, the sorption medium being capable of sorbing and desorbing the operating medium, the operating medium steam line having a shut off device which selectively restricts the flow of evaporated operating medium between the operating medium container and the sorption medium container (c) a control and regulating unit coupled to the heating element, the sorption medium container, the shut off device and the operating medium container, the control and regulating unit monitoring characteristics of the sorption medium container and the operating medium container, the control and regulating unit manipulating the amount of operating medium sorbed and desorbed by the sorption medium by manipulating the shut-off device and an amount of heat energy provided by the heating element to the sorption medium cartridge based upon conditions within the sorption medium container and the operating medium container wherein during desorption of the operating medium, heat energy is absorbed by the sorption medium from the heating element.

2. Sorption apparatus having a storage and discharge capability of heat and cold as defined by claim 1 wherein after the operating medium has been desorbed from the sorption medium, the control and regulating unit manipulates the shut off device in order to prevent the resorption of operating medium by the sorption medium, the control and regulating unit further permitting the operating medium and sorption medium to cool to an ambient temperature.

3. Sorption apparatus having a storage and discharge capability of heat and cold as defined by claim 1 further comprising:

a vacuum pump being coupled to the sorption medium container, the vacuum pump decreasing an internal pressure of the sorption medium container such that the operating medium can flow freely from the operating medium container to the sorption medium container.

4. Sorption apparatus having a storage and discharge capability of heat and cold as defined by claim 1 wherein the sorption medium can be separated from the sorption medium container such that the sorption medium can be desorbed separate and apart from the sorption medium container.

5. Sorption apparatus having a storage and discharge capability of heat and cold as defined by claim 1 wherein the sorption medium container includes a heat emission device through which heat is discharged during a sorption phase.

6. Sorption apparatus having a storage and discharge capability of heat and cold as defined by claim 1 wherein the sorption medium is zeolite and the operating medium is water.

7. Sorption apparatus having a storage and discharge capability of heat and cold as defined by claim 1 wherein the sorption apparatus is utilized on motor vehicles for heating and cooling of enclosed spaces.

8. Sorption apparatus having a storage and discharge capability of heat and cold as defined by claim 1 wherein an amount of operating medium within the sorption apparatus is greater than the maximal amount which can be absorbed by a sorption medium, and wherein the operating medium which is not received by the sorption medium is utilized as a heat reservoir within the operating medium container.

9. Sorption apparatus having a storage and discharge capability of heat and cold as defined by claim 1 wherein a volume of operating medium which is not evaporated and received by the sorption medium solidifies within the operating medium container and wherein the heat emitted during solidification is utilized so that an additional amount of operating medium will evaporate.

10. A method of generating and storing heat and cold, and discharging heat and cold from a sorption apparatus, the sorption apparatus having a sorption medium container containing sorption medium therein, and having a heating element in thermal communication therewith, an operating medium container coupled to the sorption medium container by an operating medium steam line having a shut off device which alternately permits and restricts a flow of evaporated operating medium therethrough, a control and regulating unit coupled to the sorption medium container, the shut off device, the heating element and the operating medium container, the method comprising:

(a) utilizing the control and regulating unit to manipulate the amount of operating medium that is sorbed and desorbed by the sorption medium by substantially simultaneously monitoring the temperature of the operating medium and sorption medium, varying the amount of heat provided by the heating element to the sorption medium and manipulating the shut off device;

(b) utilizing the control and regulating unit to open the shut-off device to permit fluid communication between the operating medium container and the sorption medium container;

(c) desorbing operating medium from the sorption medium by utilizing the control and regulating unit to manipulate the heating element to increase a temperature of the sorption medium during a desorption phase;

(d) permitting evaporation of the operating medium from the operating medium container;

(e) permitting sorption of the operating medium by the sorption medium, the sorption medium receiving heat energy from the operating medium causing the sorption medium to increase in temperature and generate heat, the operating medium transferring heat energy to the sorption medium to decrease in temperature and generate cold; and, (f) performing one of discharging the heat absorbed by the sorption medium by passing a fluid over the sorption medium container which will absorb heat energy from the sorption medium, and discharging the cold generated by the operating medium by passing a liquid over the operating medium container which will transfer cold from the operating medium to the liquid.

11. A method of generating and storing heat and cold, and discharging heat and cold from a sorption apparatus as defined by claim 10, wherein prior to step c, the method further comprising:

maintaining a relatively high temperature of operating medium vapor and the sorption medium by supplying heat thereto.

12. A method of generating and storing heat and cold, and discharging heat and cold from a sorption apparatus as defined by claim 10, wherein prior to step c, the method further comprising:

decreasing the temperature of the sorption medium when it is desirable to discharge heat by passing a liquid over the sorption medium container.

13. A method of generating and storing heat and cold, and discharging heat and cold from a sorption apparatus as defined by claim 10, wherein prior to step c, the method further comprising:

heating the operating medium in order for the sorption medium to receive the operating medium.

14. A method of generating and storing heat and cold, and discharging heat and cold from a sorption apparatus as defined by claim 10, wherein an amount of operating medium contained within the sorption apparatus is greater than a maximum amount which can be received by the sorption medium.

15. A method of generating and storing heat and cold, and discharging heat and cold from a sorption apparatus as defined by claim 14, wherein the temperature of the operating medium which is not received by the sorption medium is permitted to drop below a solidifying temperature of the operating medium.

16. A method of generating and storing heat and cold, and discharging heat and cold from a sorption apparatus as defined by claim 15, wherein generated cold is provided by a carrier to an area which is to be cooled.

* * * * *

UNITED STATES PATENT AND TRADEMARK OFFICE
CERTIFICATE OF CORRECTION

PATENT NO. : 5,518,069
DATED : May 21, 1996
INVENTOR(S) : Maier-Laxhuber et al.

It is certified that error appears in the above-indentified patent and that said Letters Patent is hereby corrected as shown below:

Column 8, Line 11,   now reads "medium container", should read

--medium container;--

Column 8, Line 23,   now reads "medium container", should read

--medium container;--.

Signed and Sealed this

Eleventh Day of February, 1997

Attest:

BRUCE LEHMAN

Attesting Officer    Commissioner of Patents and Trademarks